United States Patent [19]
Sugita

[11] 3,821,928
[45] July 2, 1974

[54] APPARATUS FOR CONTINUOUS EXPRESSION

[75] Inventor: Takemi Sugita, Osaka, Japan

[73] Assignee: Moritake Iron Works Co., Ltd., Osaka, Japan

[22] Filed: Nov. 13, 1972

[21] Appl. No.: 306,095

[30] Foreign Application Priority Data
May 10, 1972 Japan............................ 47-46253

[52] U.S. Cl................ 100/118, 100/154, 210/386, 210/401
[51] Int. Cl....................... B30b 9/24, B01d 31/04
[58] Field of Search.................. 210/386, 400, 401; 100/110, 116, 118, 119, 120, 151, 152, 153, 154; 198/193, 196, 198

[56] References Cited
UNITED STATES PATENTS
2,349,080 5/1944 Deck............................ 100/151 X
3,677,411 7/1972 Ishigaki........................ 210/401 X FOREIGN PATENTS OR APPLICATIONS
601,270 2/1926 France.......................... 100/119
650,935 2/1929 France.......................... 198/193

Primary Examiner—Roy Lake
Assistant Examiner—James W. Davie
Attorney, Agent, or Firm—Allison C. Collard

[57] ABSTRACT

An apparatus including a lower endless filter belt and an upper endless pressing belt with a squeezing chamber formed therebetween. The filter belt comprises a belt main body impermeable to liquid for backing and a filter medium covering the main body to provide a filtrate passageway therebetween and is inclined with its one end positioned at a higher level than the other end. The belt main body is substantially in the form of a trough having upstanding portions along its opposite side edges and receives filtrate which has passed through the filter medium, permitting the same to flow down the inclined filter belt and drop from its one end.

12 Claims, 9 Drawing Figures

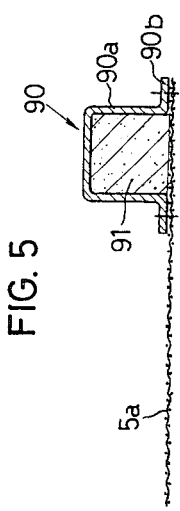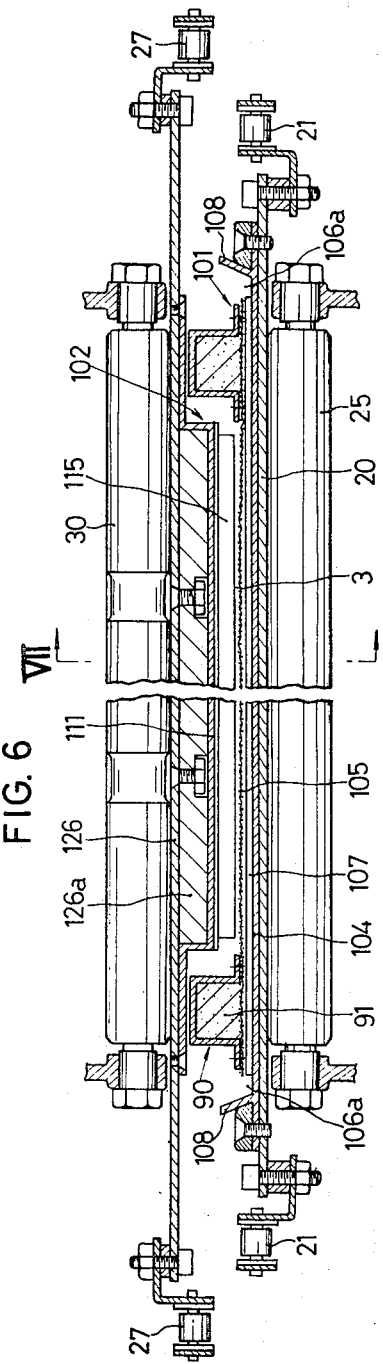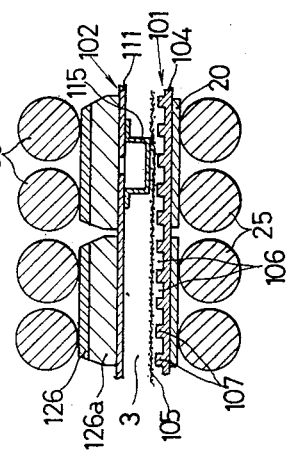
FIG. 5
FIG. 6
FIG. 7

APPARATUS FOR CONTINUOUS EXPRESSION

BACKGROUND OF THE INVENTION

The present invention relates to an apparatus for removing liquid from slurry or mudlike mixture produced from the food industry, chemical industry, etc. and containing a relatively large amount of liquid, more particularly to an apparatus for continous expression in which a feed mixture travelling on an endless filter belt driven in circulation is squeezed from above by a pressing belt driven in like manner to force out the liquid content from the mixture.

Various apparatuses of the type described have heretofore been known which have versatile specific construction. However, the conventional apparatuses are all so designed that the filtrate separated from a mixture to be treated passes through a filter belt conveying the mixture thereon and drops directly into a filtrate receptacle positioned below the belt and extending almost over the entire length thereof. Accordingly they have the drawback that the filtrate contacts many parts of the apparatus when dropping from the belt to cause rapid corrosion of the parts. The filtrate further comes into direct or indirect contact with rollers supporting the belt thereon and other rotary portions, causing troubles to the mechanical movement of the parts in a relatively short period of time. Such problems become more pronounced in the case of alkaline or acidic filtrate. To avoid these troubles, the entire apparatus or many of its parts which are liable to be exposed to the filtrate have to be fabricated from corrosion resistant materials, but this renders the apparatus very costly and is therefore disadvantageous.

SUMMARY OF THE INVENTION

An object of this invention is to provide an improved apparatus for continuous expression which is free of the foregoing problems.

According to this invention, the expressing apparatus has a filter belt for separating liquid from a mixture to be treated, and at least working portion of the filter belt, namely the upper run thereof for carrying the feed mixture thereon is inclined with its one end positioned at a higher level than the other end. The filter belt includes an endless belt main body forming a filter bed and made of a liquid impermeable material and a filter medium covering the main body for separating the liquid from the solids in the feed mixture. The belt main body has opposite side edges which define the transverse limits of a filtrate passageway formed between the main body and the filter medium. The belt main body therefore serves substantially as a trough. Accordingly the filtrate which has passed through the filter medium flows along the inclined filter belt longitudinally thereof and is collected at the lower end of the belt main body, from which the whole filtrate drops into a filtrate receptacle disposed below the belt. The filter medium further extends from the abovementioned lower end of the main body independently thereof so as to prevent the dropping filtrate from wetting the filter medium and penetrating the same again in the reverse direction to preclude the diffusion of the filtrate over a wide area.

Obviously, the foregoing construction assures the advantage of avoiding the objection that the filtrate will penetrate the filter medium and drop therefrom over its entire area to wet the frame and rotary portions of the apparatus. Another advantage is that the apparatus can be provided at a relatively low cost as compared with conventional apparatuses without substantial increase in the number of the constituent parts and without increased difficulties in manufacture.

Other features, objects and advantages of this invention will become apparent from the following detailed description of embodiments with reference to the drawings.

BRIEF DESCRIPTION OF THE DRAWINGS

FIG. 5 is a cross sectional view corresponding to FIG. 4 and showing a modified embodiment of this invention;

FIG. 6 is a view in section corresponding to FIG. 2 and showing another embodiment of this invention;

FIG. 7 is a view in section taken along the line VII—VII in FIG. 6 and showing the same embodiment;

DESCRIPTION OF THE PREFERRED EMBODIMENTS

Figure 1:
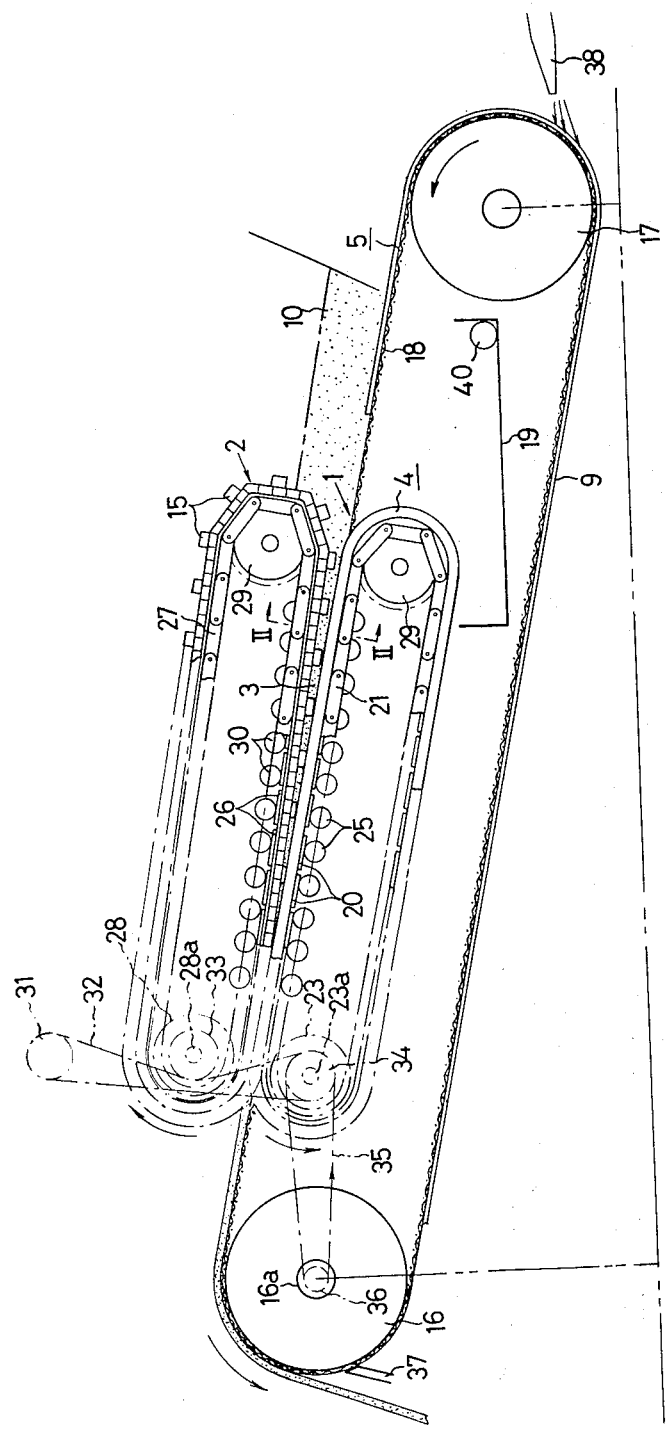
FIG. 1 is a schematic side elevation showing an apparatus embodying this invention, with parts not essential to the understanding of the invention omitted.

An embodiment of this invention shown in FIG. 1 includes a lower endless filter belt 1 and an upper endless pressing belt 2 positioned in face-to-face relation. A squeezing chamber 3 formed between the belts 1 and 2 has the greatest space at its one end for feeding a mixture 10 to be treated and the smallest space at the other end for discharge.

Figure 2:
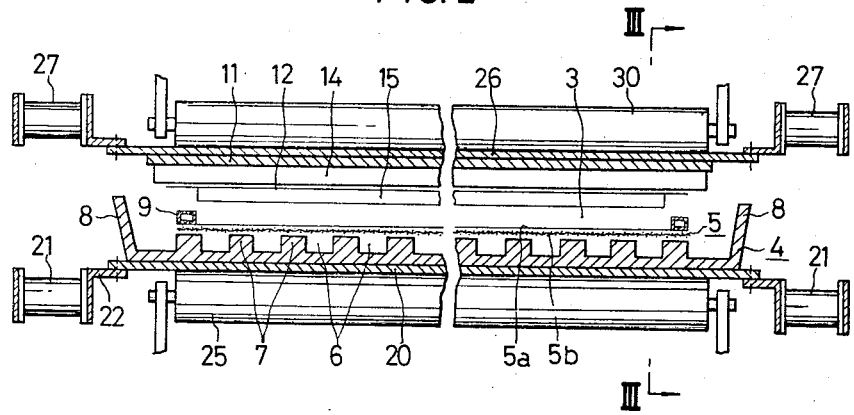
FIG. 2 is a view in section taken along the line II—II in FIG. 1 and showing the same embodiment.
Figure 3:
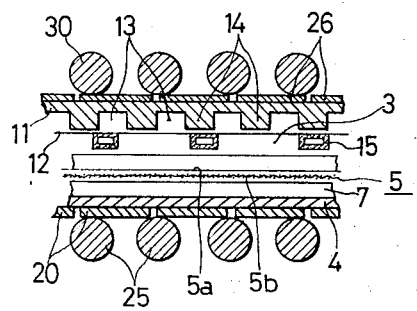
FIG. 3 is a view in section taken along the line III—III in FIG. 2.
Figure 4:
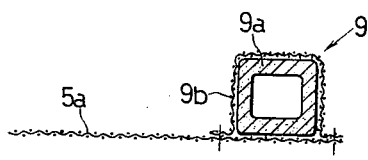
FIG. 4 is a cross sectional view showing part of a filter medium in the embodiment of FIG. 1 which includes a projecting member along one side edge of the filter medium.

With reference to FIGS. 2 and 3, the filter belt 1 has a belt main body 4 serving as a filter bed and made of a liquid impermeable material such as rubber and a filter medium 5 covering the upper face of the main body in the form of a net conveyor of a double construction. Between the main body and filter medium there is formed a space 6 serving as a filtrate passageway which is transversely divided into a plurality of independent passages by a plurality of projections 7 on the outer face of the main body for supporting the filter medium, the support projections 7 extending in parallel over the entire length of the belt main body 4 longitudinally thereof. The belt main body 4 is formed along its opposite side edges with obliquely upstanding portions 8 higher than the projections 7 to define the outermost transverse limits of the passageway 6. The filter medium 5 consists, for example, of a face member 5a which is porous over its entire area and a backing member 5b for preventing partial and easy deformation of the face member. The face member is made of a nylon fabric woven in a relatively fine texture, a porous mat of synthetic resin or, where desired, a metal net of fine mesh. Further a metal net of relatively coarse mesh is mainly used for the backing member. However, depending on the type of the mixture to be treated, the filter medium 5 may be of a single construction made of a single material selected from among various materials as given above. The filter medium 5 has projecting members 9 defining the transverse limits of the squeezing chamber 3 for preventing the feed mixture from being forced out. As seen in FIG. 4, the projecting member is composed of a hollow member 9a made of an elastic material such as rubber and a woven fabric 9b covering the hollow member 9a and stitched to the face member 5a. A modified projecting member 90 which is easier to make as shown in FIG. 5 comprises an elastic hollow member 90a of a hat-like cross section whose opposite side edges 90b are secured to the face member 5a by suitable means. The hollow member 90a may be filled with a filler 91 such as sponge which is readily deformable under compression. Use of the projecting member 9 or 90 composed of an elastic hollow body assures the advantage that the projecting member can be readily flattened under pressure to permit the belt means to exert a compressive force on the feed mixture always effectively.

On the other hand, the upper pressing belt 2 includes a belt main body 11 made of the same material as in the case of the filter belt already described and a single-layer filter medium 12 covering the main body over its outer face so as to act as auxiliary filtering means. A filtrate passageway 13 formed between the belt main body 11 and the filter medium 12 is divided into a plurality of sections by projections 14 for supporting the filter medium which are formed on the outer face of the main body 11 in parallel to the transverse direction. The filter medium 12 is provided between its opposite side edges with a plurality of protrusions 15 extending transversely thereof and having such length as to fit in between the parallel projecting members 9 and 9 along the opposite side edges of the filter medium 5 on the lower filter belt 1. The protrusions 15 divide the squeezing chamber 3 into a plurality of unit sections longitudinally thereof. Accordingly, the protrusions 15 serve to prevent the feed mixture from easily escaping in the direction opposite to that of travel of the belt. The protrusions 15 have the same construction as already described with reference to FIGS. 4 and 5 and can therefore be readily flattened under pressure.

Referring again to FIG. 1, it is seen that the filter belt 1 and pressing belt 2 are inclined, the inclination being such that the mixture 10 to be treated will be positioned at the lowest level at the feed end so that the resulting cake, almost free from water, may be positioned at the highest level at the discharge end. The inclination given in the above-mentioned direction is effective in preventing the filtrate, once separated from the mixture, from being forced out of the passageway 6 to wet the mixture again while it flows downward through the interior of the filter belt 1.

The filter medium 5 of the filter belt 1 is reeved around a drive drum 16 and a driven drum 17. The intermediate portion of upper run of the filter medium 5 passes on the closed belt main body 4 and the opposite end portions of the same extend away from the belt main body 4 independently thereof. One of the independent extensions which slopes downward from the belt main body 4 provides an area 18 for spontaneous filtration of the mixture to be treated, above which there is disposed an unillustrated mixture feeding hopper equipped with a feeder of a usual construction for supplying the mixture at a constant rate. A filtrate receptacle 19 is in the form of a relatively small box having an open top and an outlet 40 near its bottom. It is positioned below the part including the lower end of the belt main body 4 and the extension 18 of the filter medium 5 so as to receive dropping filtrate.

Disposed inside the main body 4 of the filter belt 1 are a great number of squeezing plates 20 extending transversely of the belt and arranged side by side. In other words, the belt main body 4 extends around the row of squeezing plates 20. The squeezing plates 20 are all connected together in an endless form by a pair of roller chains 21 and 21 provided along the opposite ends of the squeeze plates 20. As shown in FIG. 2, the roller chain 21 has an attachment 22 formed by bending a link and fixed to the end of the plate 20 by fastening means such as bolt and nut. The roller chains 21 and 21 are reeved around a drive sprocket wheel 23 and a driven sprocket wheel 24. A greater number of lower press rollers 25 extend in the transverse direction side by side to support the row of the pressure plates 20 thereon.

Exactly in the same arrangement as above, the upper pressing belt 2 has a great number of squeezing plates 26, a pair of roller chains 27 and 27 connecting the plates 26 in an endless form, a pair of drive sprocket wheel 28 and driven sprocket wheel 29, and a great number of upper press rollers 30 bearing on the back of the row of squeezing plates 26.

A sprocket wheel 31 of a prime mover is operatively connected, through chain-sprocket transmission means 32, 33, 34, 35 and 36, to shafts 23a, 28a and 16a of the drive sprocket wheels 23, 28 and drive drum 16 to drive them in the specified directions. Thus the lower filter belt 1 and upper pressing belt 2 are driven in directions opposite to each other, while the belt main body 4 and the filter medium 5 of the lower filter belt 1 are driven in the same direction. All the belts and the filter medium are driven at the same linear speed.

After expression, a scraper 37 removes all the squeezed material off the filter medium 5 completely. A spray 38 forces a wash liquor against the filter medium 5 for cleaning.

The embodiment of this invention described operates as follows.

The unillustrated prime mover, when initiated into operation, drives the filter belt 1 and the pressing belt 2 along with squeezing plates 20 and 26 respectively at the same linear speed in the directions indicated by the arrows in FIG. 1. In this state, the mixture 10 to be treated is fed onto the extension 18 of the filter medium 5 continuously and at a constant rate. First, part of water contained in the mixture 10 passes through the filter medium 5 and drops directly into the filtrate receptacle 19 therebelow under gravity in atmospheric environment. The mixture 10 containing the remainder of water is then carried into the squeezing chamber 3 between both belts 1 and 2.

The press rollers 25 and 30 prevent bulging of the belts 1 and 2 where they define the squeezing chamber 3, which, moreover, is progressively reduced in volume toward the front, with the result that the feed mixture 10 is compressed from above with the result that the feed mixture 10 is compressed from above with increasing pressure, causing the liquid content to be forced out of the chamber through the lower filter medium 5 and upper filter medium 12 for separation from the solids. The separated filtrate enters the filtrate passageways in the interior of the belts 1 and 2. The filtrate running into the filtrate passageway 6 flows down along the inclined filter belt 1 in the direction opposite to that of travel of the belt and drops into the filtrate receptacle 19 at the rear turning end of the belt main body 1, where the filter medium 5 leaves the main body 4, free of wetting with the filtrate. On the other hand, the filtrate entering the transverse sections of the upper filtrate passageway 13 flows toward the opposite sides of the pressing belt and drops from the opposite ends of the passageway sections into the filtrate passageway 6 at both side edges of the lower filter belt 1. In the same manner as above, the filtrate is collected in the receptacle 9.

During the foregoing expression process, the projecting members 9 on the opposite side edges of the lower filter medium 5 prevent the mixture 10 from being forced out from the opposite sides of the squeezing chamber 3, while the transverse protrusions 15 on the upper filter medium 12 preclude the backward slipping escape of the mixture 10 due to progressive increase in compression. Further the suqeezing portions of the filter belt 1 and pressing belt 2 in face-to-face relation are retained in planar position by the squeezing plates 20 and 26.

The treated material almost free from liquid and discharged from the chamber 3 is mostly removed from the lower filter medium 5 at its front end where it turns downward and the remainder is scraped off by the scraper 37. Subsequently, the filter medium is washed with liquor applied by the nozzle 38 and is then driven to the upper position for use in circulating fashion.

Figure 9:
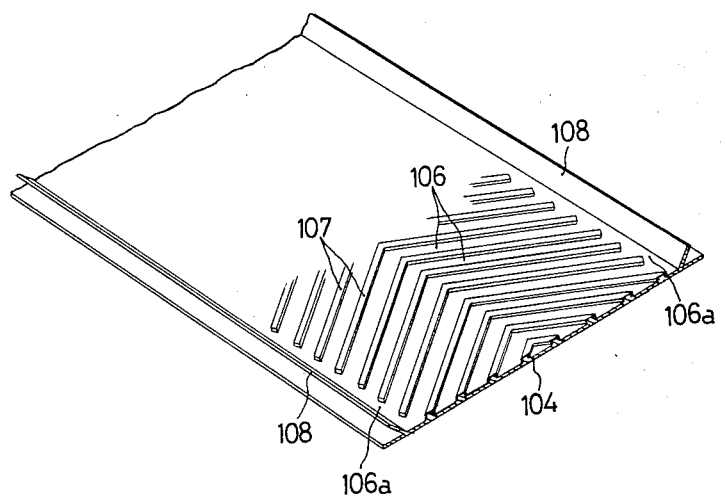
FIG. 9 is a fragmentary perspective view showing the belt main body of lower filter belt of the embodiment in FIG. 6 as it is seen from outside.

FIGS. 6 and 9 show another modified embodiment of expressing apparatus of this invention. According to this embodiment, the closed belt main body 104 of a lower filter belt 101 is provided, on its outer face, with a great number of V-shaped projections 107 extending in the transverse direction as seen in plan (see FIG. 9) and each having a pointed midportion positioned at the center of width of the belt main body 104. The opposite ends of each projection are directed downward in accordance with the longitudinal inclination of the belt main body 104. Thus each filter passageway 106 between adjacent projections 107 and 107 is in a bent form extending transversely of the belt main body. The passageway 106 is at the highest level at its bent point and slopes downward toward the opposite ends. The opposite ends of each bent projection 107 are spaced from upstanding portions 108 along both side edges of the belt main body 104 to provide therebetween longitudinal passageways 106a for collecting the filtrate. Preferably, the projection 107 may be bent at an angle of about 120° to 130°.

The peculiar form of the projection 107 makes it possible to provide the short inclined filtrate passageways 106 beneath the squeezing chamber which are effective to discharge the filtrate from the squeezing chamber promptly. The resulting advantage will be apparent from comparison with the embodiment shown in FIGS. 1 to 3. The longitudinal projections 7 as shown in FIG. 2 form the very long filtrate passageway 6 which will be quickly filled with the filtrate that has passed through the filter medium 5, with the consequent disadvantage that the filtration by the filter medium will be impaired. The projections 107 of the shape illustrated in FIG. 9 are free of such disadvantage.

A filter medium 105 included in the filter belt 101 is made for example of a woven fabric of a single layer and has along its opposite edges longitudinal projecting members 90 having a construction as already described with reference to FIG. 5.

Figure 8:
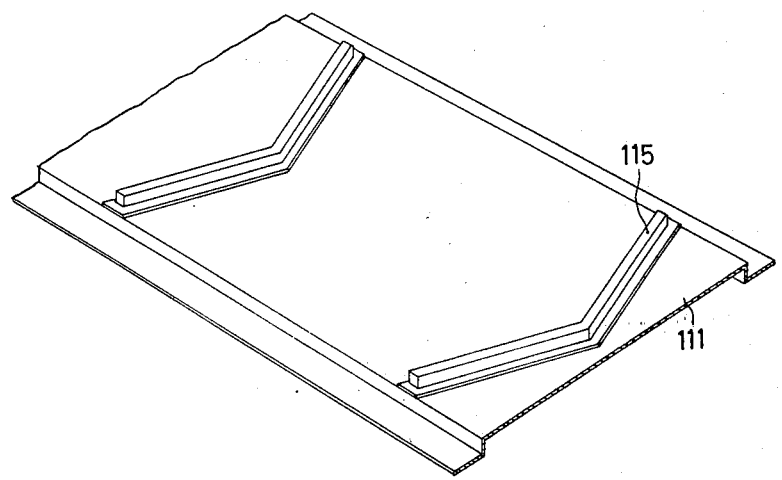
FIG. 8 is a fragmentary perspective view showing a filter medium covering the upper pressing belt of the embodiment in FIG. 6 as it is seen from outside.

An upper pressing belt 102 of the non-filtration type includes a closed belt main body 111 which covers auxiliary plates 126a fixed to the outer faces of upper squeezing plates 126. The belt main body has a transversely elongated hat-like section. Fixed to the outwardly projecting top portion of the belt main body are a greater number of transversely extending protrusions 115 for preventing escape of the feed mixture. The protrusion is made of an elastic material separately from the main body 111, has a hat-like cross section and is bent at its midportion in a V-shaped form as seen in FIG. 8. The protrusions 115 are fixed to the belt main body at specified spacing, with the opposite ends thereof extending toward the direction of travel of the feed mixture. In other words, the protrusions 115 are oriented exactly in opposite direction with respect to the projections 107 on the lower filter belt 111. The protrusions 115 may preferably be bent, for example, at an angle of about 120° to 150°.

The protrusions 115 on the pressing belt 102 which are bent in the specified direction assure the advantage that they guide the feed mixture toward the center of the belt during travel to prevent escape of mixture from the opposite sides of the belt with greater effectiveness.

The other parts of the embodiment of FIGS. 5 to 6 which have not been described specifically are of the same construction as already stated with respect to the embodiment of FIGS. 1 to 4. Similar parts are indicated at the same reference numerals.

According to the embodiment shown in FIG. 6, the filtrate separated out in the chamber 3 from the solids and passing through the filter medium 105 enters the filtrate passageways 106, flows quickly toward the opposite sides of the belt main body 104 into the longitudinal passageways 106a to reach one end of the belt main body 104, from which the liquid drops into the filtrate receptacle.

Although the illustrated embodiments have filtrate passageways in the lower filter belt defined by the projections on the closed belt main body, the objects of this invention can likewise be achieved by interposing, between the filter medium and the belt main body, an intermediate member such as a metal net which is serviceable as a spacer, instead of using the projections.

It is especially important according to this invention that the lower filter belt be inclined and that the filter belt have filter passageways for flowing the filtrate in the longitudinal direction. This makes it possible to collect the filtrate at one portion and then in the receptacle and to thereby overcome the aforementioned problems resulting from the contact of the filtrate with many parts of the apparatus.

I claim:

1. In an apparatus for continuous expression including a lower endless filter belt and an upper endless pressing belt to be circulated between a multitude of press rollers and arranged in face-to-face relation to each other, with a squeezing chamber formed between the two belts for causing a solid-liquid mixture to be introduced thereinto to recover the liquid by separating the same from the solids, the filter belt comprising a liquid-impermeable belt main body having longitudinal upstanding portions formed along its opposite side edges respectively for defining the transverse limits of a filtrate passageway and a filter medium covering the upper face of the belt main body with the filtrate passageway formed therebetween, the filter belt being so inclined that at least the upper run thereof is positioned at a high level at its one end with the other end thereof positioned at a low level, the filter medium extending away from the end of the belt main body at the low level independently of the belt main body, mixture feeding means mounted on the extending portion of the filter medium independent of the belt main body and a receptacle having an open top positioned below the extension of the filter medium so that the filtrate will flow down the incline between the longitudinal upstanding portions formed on the opposite side edges of the belt main body and pass through the filter medium into the open receptacle.

2. The apparatus for continuous expression as set forth in claim 1 wherein the space between the filter belt and the pressing belt defining the upper and lower faces of the squeezing chamber progressively reduces from the feed end for the mixture to be treated toward the discharge end for cake.

3. The apparatus for continuous expression as set forth in claim 1 wherein the filter medium is provided along its opposite side edges with projecting members defining the transverse limits of the squeezing chamber.

4. The apparatus for continuous expression as set forth in claim 3 wherein each of the projecting members is an elastic hollow body.

5. The apparatus for continous expression as set forth in claim 1 wherein a number of squeezing plates extend transversely side by side on the inner peripheral face of each of the filter belt and pressing belt and the squeezing plates are connected together at their opposite ends by endless drive chains for conjoint movement with the filter belt.

6. The apparatus for continuous expression as set forth in claim 1 wherein the belt main body is provided between its opposite side edges with a number of projections for supporting the filter medium thereon and independent filtrate passages are formed between the projections.

7. The apparatus for continuous expression as set forth in claim 6 wherein the projections for supporting the filter medium extend longitudinally of the belt main body in parallel.

8. The apparatus for continuous expression as set forth in claim 6 wherein the projections for supporting the filter medium extend transversely of the belt main body and have opposite ends spaced from the upstanding portions of the belt main body along its opposite edges.

9. The apparatus for continuous expression as set forth in claim 8 wherein the projections for supporting the filter medium are V-shaped when the belt main body is seen in plan and have opposite ends directed downward in accordance with the inclination of the filter belt so as to permit the filtrate to flow down quickly toward the opposite side edges of the belt main body.

10. The apparatus for continuous expression as set forth in claim 3 wherein the pressing belt is provided on its outer peripheral face with a number of protrusions extending transversely thereof side by side and the protrusions fit in between the opposite projecting members on the filter medium to prevent the feed mixture from escaping backward.

11. The apparatus for continuous expression as set forth in claim 10 wherein each of the protrusions is an elastic hollow body.

12. The apparatus for continuous expression as set forth in claim 10 wherein the protrusions are V-shaped when the pressing belt is seen in plan and have opposite ends directed toward the direction of travel of the feed mixture on the filter belt.

* * * * *